(12) United States Patent
Guthrie

(10) Patent No.: US 9,062,795 B2
(45) Date of Patent: Jun. 23, 2015

(54) WATER SAVER FILL VALVE AND ASSEMBLY

(71) Applicant: LAVELLE INDUSTRIES, INC., Burlington, WI (US)

(72) Inventor: Kevin J. Guthrie, Wind Lake, WI (US)

(73) Assignee: Lavelle Industries, Inc., Burlington, WI (US)

( * ) Notice: Subject to any disclaimer, the term of this patent is extended or adjusted under 35 U.S.C. 154(b) by 382 days.

(21) Appl. No.: 13/675,156

(22) Filed: Nov. 13, 2012

(65) Prior Publication Data
US 2013/0068321 A1 Mar. 21, 2013

Related U.S. Application Data

(63) Continuation-in-part of application No. 12/712,348, filed on Feb. 25, 2010, now Pat. No. 8,387,652.

(60) Provisional application No. 61/155,204, filed on Feb. 25, 2009.

(51) Int. Cl.
| | |
|---|---|
| *F16K 31/34* | (2006.01) |
| *E03D 1/32* | (2006.01) |
| *F16K 31/26* | (2006.01) |
| *F16K 21/18* | (2006.01) |

(52) U.S. Cl.
CPC ........... *F16K 31/34* (2013.01); *Y10T 137/7439* (2015.04); *E03D 1/32* (2013.01); *F16K 31/26* (2013.01); *F16K 21/18* (2013.01)

(58) Field of Classification Search
CPC ......... F16K 31/34; A01G 25/023; E03D 1/32
USPC .................... 137/414; 138/42; 251/126, 127; 239/542
See application file for complete search history.

(56) References Cited

U.S. PATENT DOCUMENTS

| | | | | |
|---|---|---|---|---|
| 3,792,588 A | * | 2/1974 | Gilaad | 239/542 |
| 4,655,397 A | * | 4/1987 | Gorney | 239/542 |
| 5,330,107 A | * | 7/1994 | Karathanos | 239/533.1 |
| 6,913,035 B2 | * | 7/2005 | Huang | 137/444 |
| 8,387,652 B2 | * | 3/2013 | Guthrie | 137/414 |
| 2003/0079780 A1 | * | 5/2003 | Fominaya Agullo | 137/414 |
| 2008/0078454 A1 | * | 4/2008 | Nichols-Roy et al. | 137/411 |

* cited by examiner

*Primary Examiner* — Craig Schneider
*Assistant Examiner* — Nicole Wentlandt
(74) *Attorney, Agent, or Firm* — Joseph S. Heino; Patrick M. Bergin

(57) ABSTRACT

An improved fill valve has a pivot valve body that is pivotally suspended immediately below a float housing and is movable between two positions. In a first position, the pivot valve body blocks the flow of water from the float housing. In a second position, the pivot body allows the flow of water from the float housing. The pivot valve body has two top compartments, each separated from the other by a wall. The first compartment retains an amount of water in it. The second compartment functions as a water flow restriction apparatus and includes an upwardly-extending member for sealing off a check valve that is disposed within the bottom of the float housing. A pressure compensating drip emitter allows water to trickle into the float housing at a very slow rate. The emitter comprises a labyrinth structure having a plurality of serpentine pathways formed in its outer surface.

7 Claims, 13 Drawing Sheets

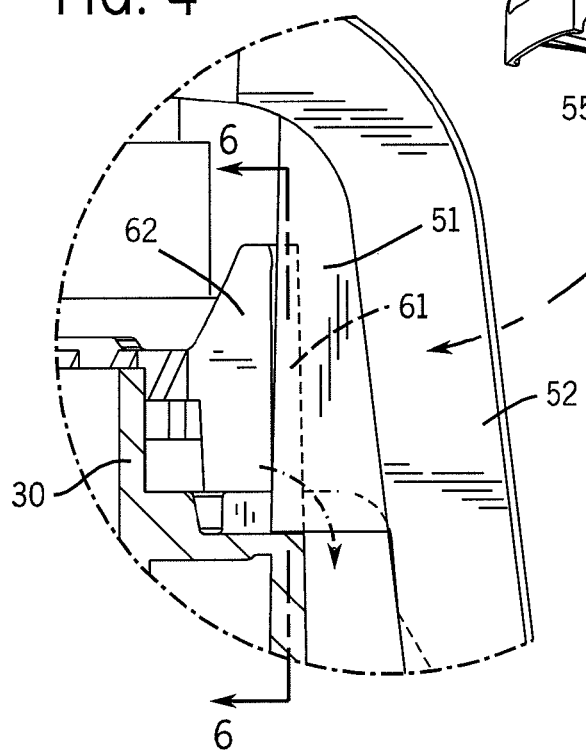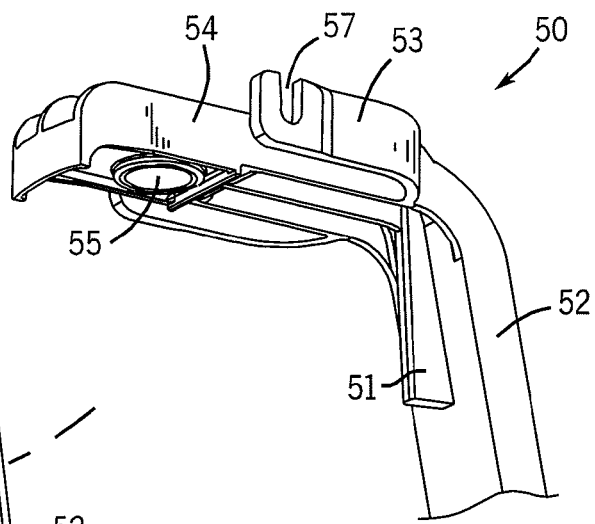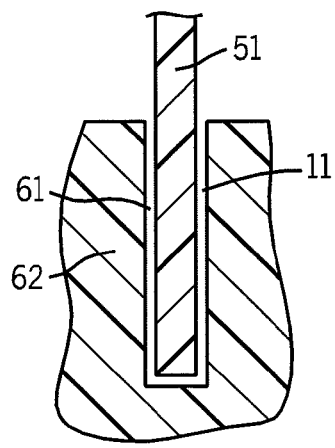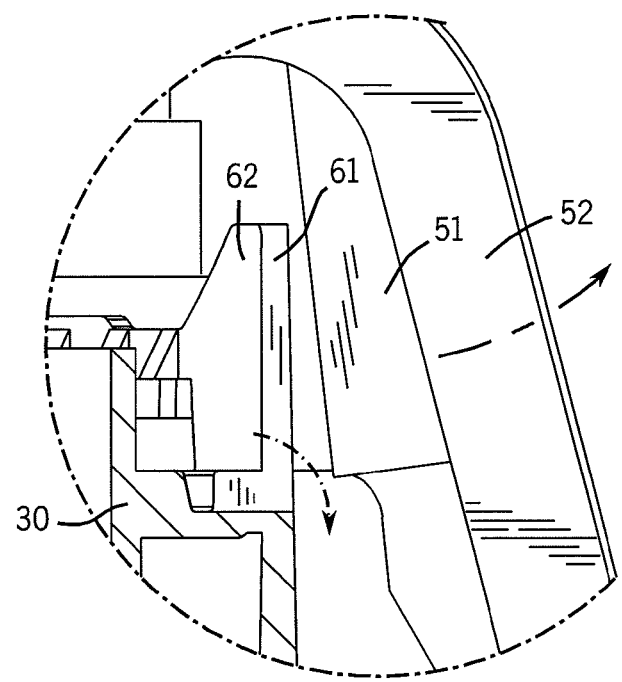

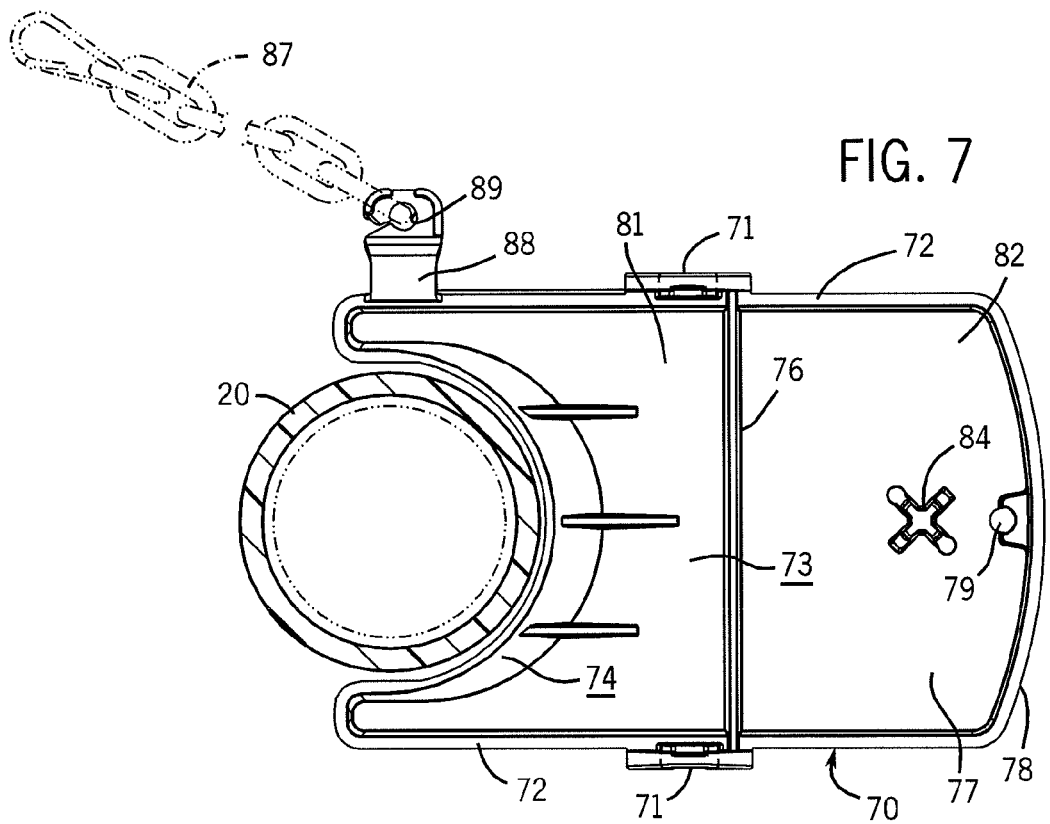
FIG. 7
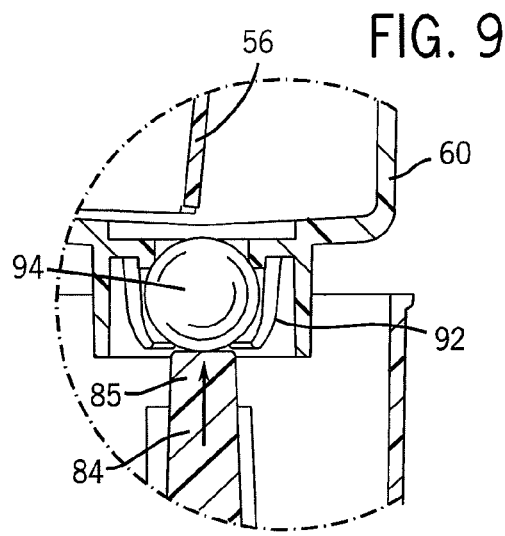
FIG. 8
FIG. 9

WATER SAVER FILL VALVE AND ASSEMBLY

This application is a continuation in part of U.S. patent application Ser. No. 12/712,348 filed Feb. 25, 2010, now U.S. Pat. No. 8,387,652 which claims the benefit and priority of U.S. Provisional Patent Application No. 61/155,204 filed Feb. 25, 2009.

FIELD OF THE INVENTION

The present invention relates generally to plumbing fixtures and to the component parts that are used in them. More particularly, it relates to a fill valve and assembly for flush systems used in gravity flush toilets. It also relates to such a fill valve and assembly that prevents water wastage under conditions where the toilet tank is prevented from filling properly due to a catastrophic flush valve leak or tank leak. It also relates to such a fill valve and assembly that limits or reduces water leakage under conditions where a relatively small flush valve leak exists.

BACKGROUND OF THE INVENTION

Conventional toilets typically employ a generally rectangular porcelain tank mounted immediately above a porcelain bowl from which a quantity of water is rapidly drained in order to flush waste from the bowl into the sewer system. One very common design uses a flapper valve made of an elastomeric material that normally covers the drain outlet of the tank. When the flush handle on the outside of the tank is manually depressed the flapper valve is lifted and the head of water in the tank drains through the drain outlet into the bowl, thereby flushing the contents of the bowl into the sewer system. The flapper valve is designed with an inverted air chamber so that it initially floats as it is lifted away from the drain outlet in the bottom of the tank. This allows sufficient flushing water to flow into the bowl even if the user immediately releases the flush handle. When the water level in the tank drops, the tank is automatically refilled through a fill valve connected to a high pressure water supply line.

The typical fill valve for the tank comprises a ballcock or pilot fill valve mounted in the tank on top of a riser which extends through an opening in the bottom of the tank and is connected to a pressurized water line in the house. When the tank drains, a float connected to the ballcock or pilot fill valve descends. This activates the ballcock or pilot fill valve and it begins to refill the tank with water at a rate much slower than the rate at which water flows through the drain outlet. When the tank is nearly empty, the flapper valve closes. The tank continues to refill as the float connected to the ballcock or pilot fill valve rises. At the same time water from the ballcock or pilot fill valve enters an overflow tube and refills the bowl to the normal standing water level to provide a trap seal. Once the float reaches a predetermined height indicating that the tank is full, the ballcock or pilot fill valve completely turns off.

The foregoing general conventional arrangement is still widely used today but has been modified in recent years with new designs to meet low volume (1.6 gal.) flush toilets required by regulations in many jurisdictions. One pilot fill valve construction that is owned by the assignee of the present application is disclosed in U.S. Pat. No. 6,003,541 entitled "Unitary Float and Arm for Float Operated Valve." Other fill valves of related construction include U.S. Pat. No. 5,975,125 entitled "Combined Filter and Noise Suppressor for Fill Valve;" U.S. Pat. No. 5,836,346 entitled "Pilot Operated Diaphragm Fill Valve;" and U.S. Pat. No. 5,715,859 entitled "Adjustable Fill Valve Assembly."

Fill valves made in accordance with the foregoing construction typically include a riser assembly, a valve housing mounted on an upper end of the riser assembly, and a pilot operated diaphragm valve mounted in the valve housing. A float housing is connected to the valve housing. A float arm of a combination float and float arm has a first end pivotally connected to the valve housing for opening and closing a pilot orifice in the diaphragm valve. A second end of the float arm is connected to the float. The float is located in the float housing which has an inlet opening for allowing water to spill into the float housing so that the float rises upwardly and the first end of the float arm fully seals off the pilot orifice. A snap-off cover member extends over and is releasably attached to the valve housing and the float housing.

One limitation of the fill valve construction discussed above is that there is no ability for the fill valve to seal off the pilot orifice in situations where a catastrophic leak in the flush valve assembly or other tank orifice results in the tank being unable to refill itself. That is, the water entering the tank is leaving the tank at a rate such that the water level does not rise to the point that it allows the float that is contained within the float housing to seal off the pilot orifice. In this mode, the fill valve could continue to allow water to run into the tank with the result that this water is simply running back out of the tank and is wasted. A similar limitation of the fill valve construction discussed above is that there is no ability to shut off the fill valve in situations where a slow leak exists in the flush valve due to wear of the flush valve, improper seating, or some other minor malfunction of the flush valve assembly. In this mode, the tank will very slowly leak water through the flush valve assembly and require intermittent functioning of the fill valve to compensate for this slow leak condition, wasting a potentially large amount of water over time.

Accordingly, it is desirable that an fill valve assembly be available to overcome the above-mentioned limitations. It is also desirable that the fill valve assembly be used as a replacement for fill valves of current manufacture, thus making it available as either an OEM or an after-market product. It is also desirable that the fill valve assembly allow for structural elements whereby water can trickle into a float housing at a very slow rate.

SUMMARY OF THE INVENTION

The assignee of the present application has a related U.S. Pat. No. 7,661,438 issued Feb. 16, 2010, titled "Improved Water Saver Fill Valve and Assembly" (the '438 patent). The '438 patent is incorporated herein by reference in its entirety. The valve and assembly of the present invention improves over the invention of the '438 patent in a significant way, however.

The filler valve and assembly of the present invention is substantially identical to that of the '438 patent in that it provides a fill valve having a pivot valve body that is mountable beneath the float housing of an existing fill valve. The pivot valve body has two compartments, a first compartment and a second compartment, disposed at the top portion of the pivot valve body. The two compartments are separated by a wall. The first compartment is functionally adapted to retain an amount of water in it. The second compartment is also functionally adapted to hold water in it, but which also functions as a water flow restriction apparatus. That is, the second compartment includes an upwardly-extending member for sealing off a check valve that is disposed within the bottom of the float housing. This second compartment also includes a small aperture that is disposed in a floor and through which water may pass at a designed rate of flow. The pivot valve body further includes a third compartment that is disposed at the bottom portion of the pivot valve body. This third compartment is located substantially beneath the second compartment and serves as an air-trapping chamber for buoying that end of the pivot valve body under certain conditions. The pivot valve body also includes a pivot means that allows it to pivot from one position to another position, depending upon whether water is contained within the second compartment or not. In this way, the pivot valve body is essentially suspended immediately below the float housing and is movable between two positions. In a first position, the pivot valve body blocks the flow of water from the float housing. In a second position, the pivot body allows the flow of water from the float housing. Under conditions where an opening in the tank is not permitting the float housing to fill with water sufficiently to raise the float, a small trickle of water is diverted from the pilot orifice into the float housing. Under the same conditions, the first compartment of the pivot valve body, which first compartment contains an amount of water in it, causes the pivot valve body to rotate to its first position thereby blocking the flow of water from the float housing. In this fashion, a small amount of water is slowly accumulated within the float housing and eventually to the point that the float is raised and the pilot orifice of the fill valve is shut off.

In the fill valve and assembly of the present invention, structural elements are provided that allow the water to trickle into the float housing at a very slow rate. Specifically, a pressure compensating drip emitter that incorporates non-clog features is provided. The drip emitter includes a plastic extruded tube that is shrunk around a plastic labyrinth. Water flows freely around and through the labyrinth. Any contaminant inside the emitter is flushed through the emitter outlets.

The foregoing and other features of the fill valve and assembly of the present invention will be apparent from the following detailed description when read in conjunction with the accompanying drawings.

BRIEF DESCRIPTION OF THE DRAWINGS

FIG. 3 is an enlarged bottom, rear and left side partial perspective view of a portion of the float rib used in the assembly.

FIG. 4 is a further enlarged and partially sectioned left side elevational view of the rib of the float taken along line 4-4 of FIG. 14.

FIG. 5 is a view similar to FIG. 4, but taken along line 5-5 of FIG. 15.

FIG. 6 is a still further enlarged and sectioned front elevational view of the float rib taken along line 6-6 of FIG. 4.

FIG. 7 is a top plan view of the pivot valve body taken along line 7-7 of FIG. 1.

FIG. 8 is a further enlarged and partially sectioned left side elevational view of the check valve at the bottom of the float housing taken along line 8-8 of FIG. 13.

FIG. 9 is a view similar to FIG. 8, but taken along line 9-9 of FIG. 14.

DETAILED DESCRIPTION

Figure 1:
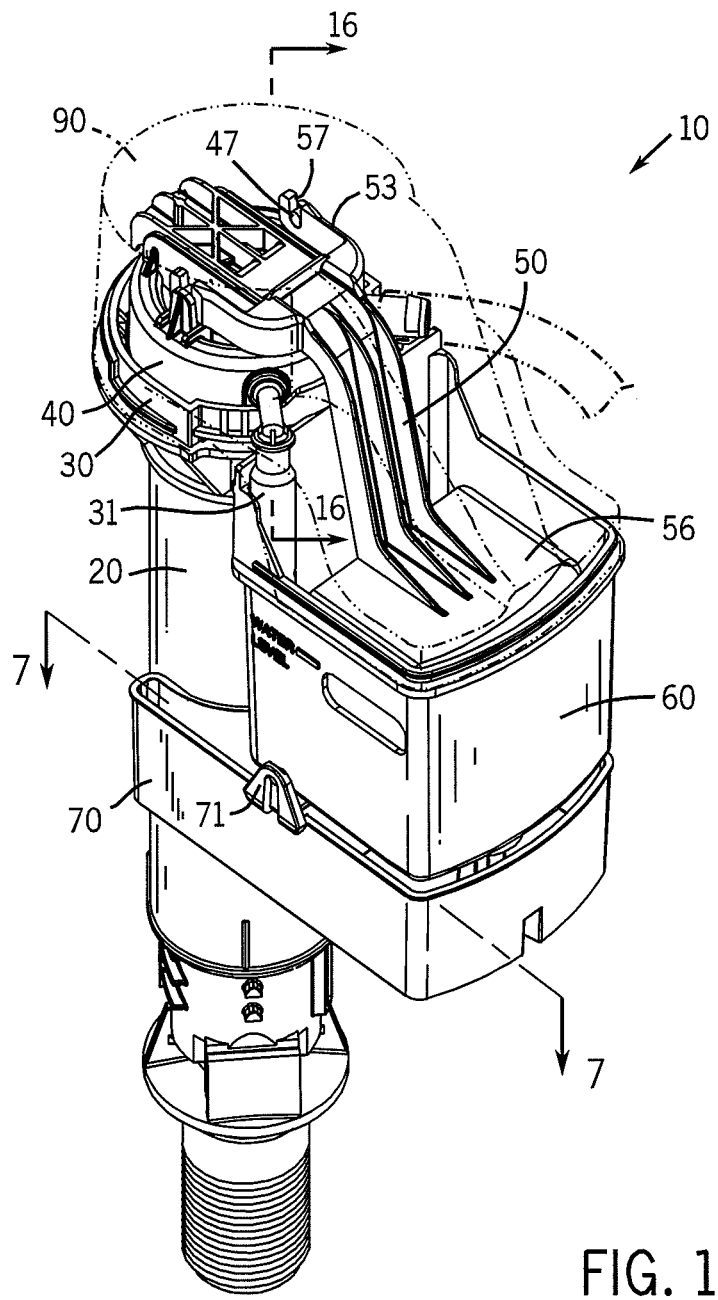
FIG. 1 is a top, front and left side perspective view of the fill valve assembly and drip emitter of the present invention.
Figure 2:
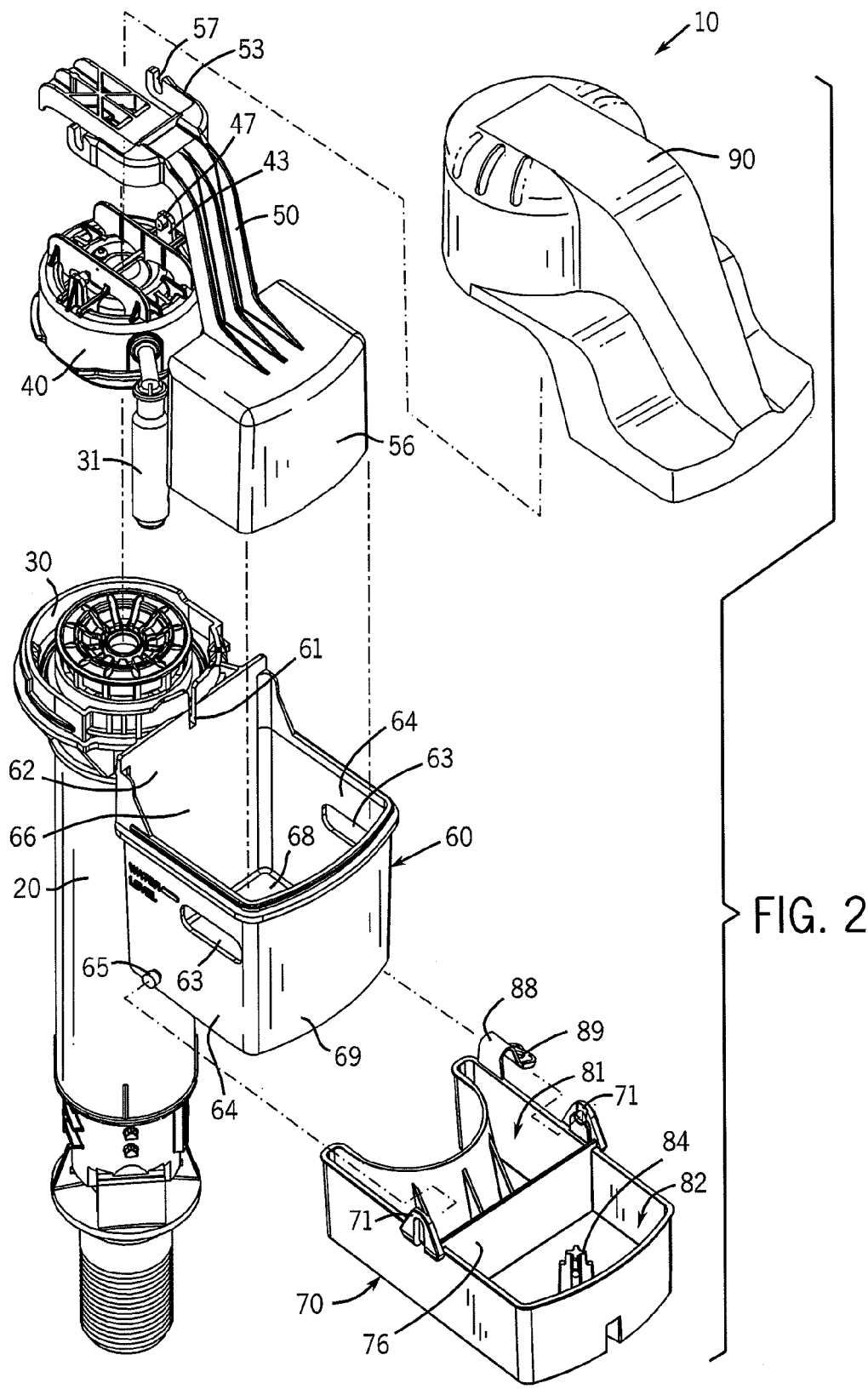
FIG. 2 is the same view shown in FIG. 1 but showing the fill valve assembly as partially exploded.

Referring now to the drawings in detail, wherein like-numbered elements refer to like elements throughout, FIGS. 1 and 2 illustrate a fill valve assembly and apparatus that is constructed in accordance with the preferred embodiment of the invention, the assembly and apparatus being designated generally by the numeral 10. For the most part, this assembly and apparatus 10 is constructed in accordance with the detailed description found in U.S. Pat. No. 7,661,438, issued Feb. 16, 2010, titled "Improved Water Saver Fill Valve and Assembly" (the '438 patent).

The overall fill valve assembly and apparatus 10 comprises an improvement over fill valves of the type generally disclosed and covered in U.S. Pat. No. 6,003,541 entitled "Unitary Float and Arm for Float Operated Valve," U.S. Pat. No. 5,975,125 entitled "Combined Filter and Noise Suppressor for Fill Valve," U.S. Pat. No. 5,836,346 entitled "Pilot Operated Diaphragm Fill Valve" and U.S. Pat. No. 5,715,859 entitled "Adjustable Fill Valve Assembly." The detailed description of the '438 patent, and any relevant disclosure contained in each of the foregoing patents, is incorporated herein by reference in its entirety.

The fill valve 10 is designed to prevent water wastage. While the fill valve 10 was designed and constructed for specific application to toilet flush tanks, it is to be understood that it may be used in many other applications to maintain a liquid level in a wide variety of storage tanks.

Referring again to FIGS. 1 and 2, it will be seen that the fill valve comprises a riser assembly 20 which is telescopically mounted within a toilet tank (not shown) and a main control valve assembly 30, 40 mounted on the upper end of the riser assembly 20. It is to be understood that the main control valve assembly 30, 40 comprises a pilot orifice (not shown) in accordance with the prior art disclosed above. The pilot orifice is controlled by means of a float-operated pilot valve assembly 50 which is a unitary monolithic construction of a float arm 52 with a float 56. The float 56 comprises an inverted box-like structure forming an air chamber on a lower most end of the float arm 52, as illustrated in FIG. 3. The other or upper end 54 of the arm 52 includes a recess (not shown) in which a pilot valve disc 55 is mounted. The recess is generally cylindrical in configuration with inwardly extending ribs (also not shown) having a relief or backward slope at the bottom of the recess. The valve disc 55 is made of a flexible or elastic material such as EPDM rubber. The disc 55 is of a generally cylindrical configuration and is thicker than the depth of the recess and is simply pressed into place.

The upper end 54 of the float arm 52 is formed with a pair of laterally disposed flexible pivot arms 53 which include bores or openings 57 that latch onto pivot pins 47 formed on upwardly extending fingers 43 on top of the valve housing cap 40. The arms 53 can flex and may be squeezed inward to allow the arms 53 to drop down over the pivot pins 47 to engage and receive the pivot pins 47. The pivot bores 57 are formed by oppositely directed overlapping slots which intersect to form the bores. This construction enables the molding of the entire assembly 50 in a one-step process in a two-part mold.

A float housing 60 is molded into and integral with the valve housing 30 and forms a float chamber 66 wherein the float 56 is disposed in the chamber 66. The float chamber 66 is defined by a rear wall 62, a front wall 69 and a pair of opposing side walls 64. These walls 62, 64, 69 form a dam up to a slot or opening 63 formed within either or both of the sidewalls 64 so that the inlet opening or openings 63 allow water to spill into the chamber 66 for rapid raising of the float 56 at the shut off level. Thus, water in the storage tank does not come into contact with the float 56 until the water level exceeds that which guarantees a positive shut off of the pilot orifice. This means the force applied by the water on the float 56 exceeds the force of the inlet water pressure on the pilot orifice. This construction provides a rather precise control of water level in the storage tank, which is critical for low volume (1.6 gal.) flush toilets or even those with less volume (1.28 gal.) flush toilets.

As shown in FIGS. 8 and 9, an outlet port in the floor 68 of the float housing 60 is controlled by a ball-type check valve 92 and a captured ball 94 that allows the float chamber 66 to empty itself of water when the water level in the storage tank is below the bottom thereof. This feature delays the drop of the float 56 until the float housing 60 is empty. The check valve 92 also closes and prevents the entry of water into the float chamber 66 as the tank is being filled. Water does not enter the float housing 60 until the water level reaches the opening 63, at which time water spills into the chamber 66 rapidly filling it to raise the float 56. This immediately closes the pilot orifice allowing pressure to build up in a pressure control chamber to close the main control valve. This cuts off water supply to the storage tank until the tank is again emptied.

When the main control valve opens, inlet water flow by way of an inlet supply tube is allowed to pass radially outward from the valve seat, then spilling over the edge and flowing down into the space between the fill tube or supply tube and the valve housing to pass into and fill the tank. A certain amount of water is allowed to flow by way of an outlet in the valve housing cap 40 and a flexible refill tube (illustrated in phantom view in FIG. 1) to flow into the overflow tube in the fixture to fill the trap. Again, this is a brief description of the fill valve concepts that are incorporated herein as described and claimed in the previously mentioned prior art.

The overall valve assembly 10 as shown in FIG. 1 has a low profile with the float housing 60 being positioned below the main control valve assembly 30, 40. A single cover member 90, as shown in FIGS. 10 through 15, covers both. The cover member 90 snaps into place and includes finger tabs (not shown) to be grasped to unlatch the cover member 90 when such is desired or required.

The fill valve assembly 10 of the present invention also has a pivot valve body 70 that is mountable beneath the float housing 60. The pivot valve body 70 is a trough-like structure having two top compartments, a first compartment 81 and a second compartment 82. See FIG. 7. The first compartment 81 is to the rear of the second compartment 82, using the points of reference and directions adopted in this application. The first compartment 81 and the second compartment 82 have common sidewalls 72 and are separated by a common dividing wall 76. The first compartment 81 is further defined by an angled and curved rear wall 74, the rear wall 74 matching the profile of the riser tube 20 that is disposed immediately behind it. The first compartment 81 also includes a floor 73. The second compartment 82 also includes a floor 77, but its floor 77 is not in a common plane with that of the floor 73 of the first compartment 81. See FIGS. 10 through 15 in that regard. In fact, it can be seen in FIGS. 10 through 15 that the displacement of the floors 73, 77 actually creates a third bottom compartment 83 which serves as an air-trapping chamber that assists in the performance of the assembly 10 during slow leakage conditions that may exist within the flush valve assembly in the tank.

The second compartment 82 is further defined by a front wall 78. Immediately behind the front wall 78 is a drain hole 79 and spaced behind the drain hole 79 is an upwardly extending finger 84 having a distal end 85. See FIG. 9. The placement of the finger 84 relative to the floor 77 of the second compartment 82 is such that the distal end 85 of the finger 84 is axially aligned with the ball 94 and check valve 92.

In this preferred embodiment, it is to be noted that the pivot valve body 70 is disposed immediately below the float housing 60. The sidewalls 72 of the pivot valve body 70 include pivot points 71 that extend upwardly and alongside the sidewalls 64 of the float housing 60. In this configuration, the lowermost outer portion of the sidewalls 64 of the float housing 60 include opposing pins 65 upon which the pivot valve body 70 may pivot. See FIG. 2. While this pivotal movement is somewhat limited, it is intentionally so as will become apparent later in this detailed description.

The first compartment 81 of the pivot valve body 70 is functionally adapted to retain an amount of water in it. Again, see FIGS. 10 through 15 in that regard. On the other hand, the second compartment 82 is functionally adapted to work as a two-way water flow restriction means. That is, the second compartment 82 includes the upwardly-extending finger member 84 for sealing off the check valve 92 that is disposed within the floor 68 of the float housing 60, as previously described. However, this second compartment 82 also includes a drain hole 79 that is disposed in the floor 77 and through which water may pass at a designed rate of flow.

As a broad overview, and as previously noted, the pivot valve body 70 includes a pivot means 71 that allows it to pivot from one position to another position, depending upon whether water is contained within the second compartment 82 or not, and depending upon whether the tank is filled or not. In this way, the pivot valve body 70 is essentially movable between two positions. In a first position, the pivot valve body 70 blocks the flow of water out of the float housing 60. In a second position, the pivot body 70 allows the flow of water out of the float housing 60. Under conditions where an opening in the tank is not permitting the float housing 60 to fill with water sufficiently to raise the float 56, a pressurized trickle of water is metered through an opening opposite a vertically disposed riverette opening 61 that is defined within the rear wall 62 of the float housing 60. This riverette opening 61 forms a water flow continuum with the float chamber 66. This water is diverted towards the riverette opening 61 thereby keeping a metered height by exhausting excess water out from two side openings 63 and then into the float chamber 66. Disposed beneath the float arm 52 is a vertically disposed float vein 51. See FIG. 3. When the float 56 is attached as intended, this float vein 51 is aligned with the riverette opening 61 of the float housing rear wall 62. See FIG. 6. When the float vein 51 is set within the riverette opening 61, a small clearance 11 which creates water surface retention on the plastic is realized about the float vein 51. The significance of this structure will be further apparent later in this detailed description.

Figure 16:
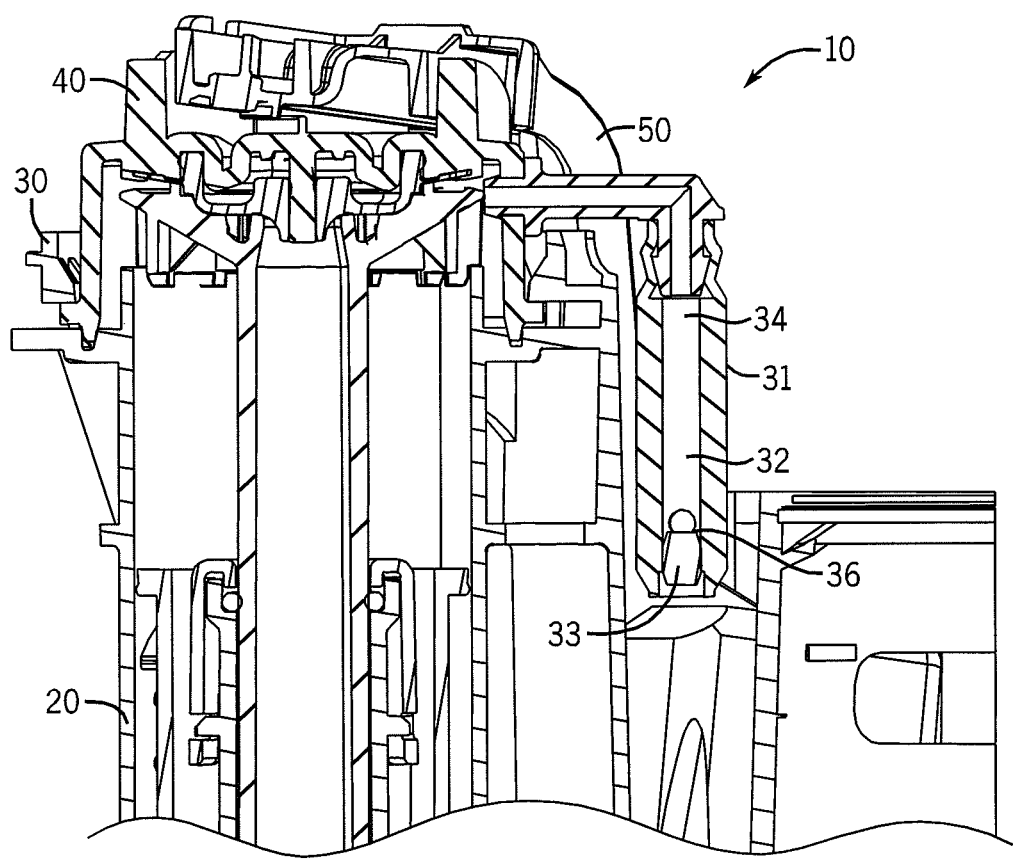
FIG. 16 is an enlarged and cross-sectioned view illustrating the pressure compensating drip emitter that is used in the fill valve and assembly of the present invention.
Figure 17:
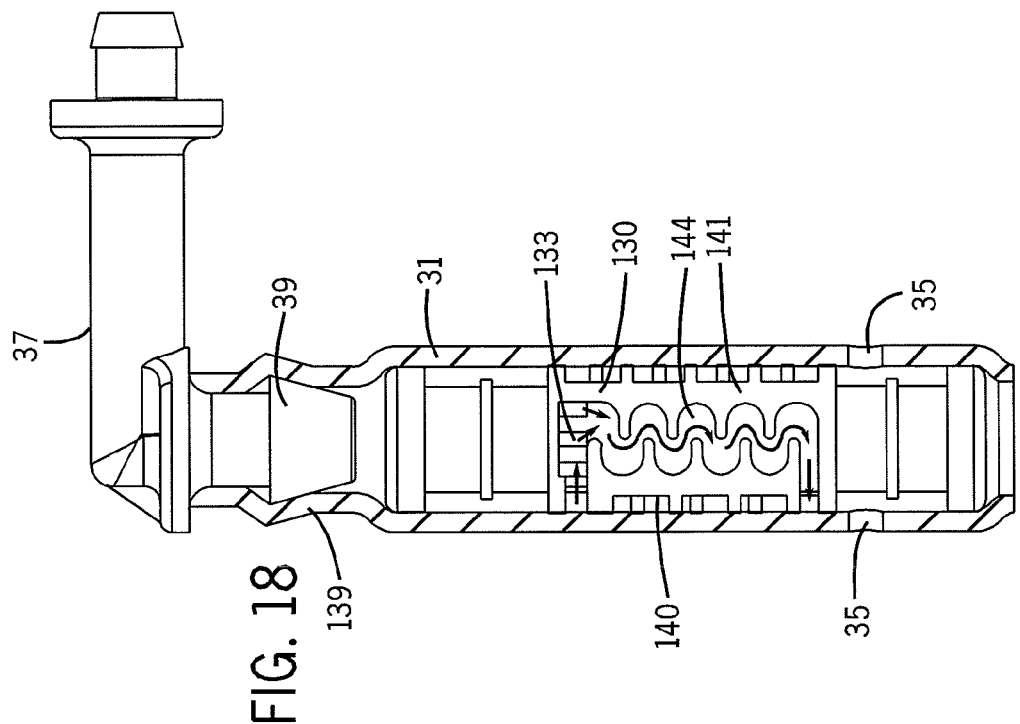
FIG. 17 is a further enlarged and cross-sectioned right side view of the pressure compensating drip emitter shown in FIG. 16.
Figure 18:
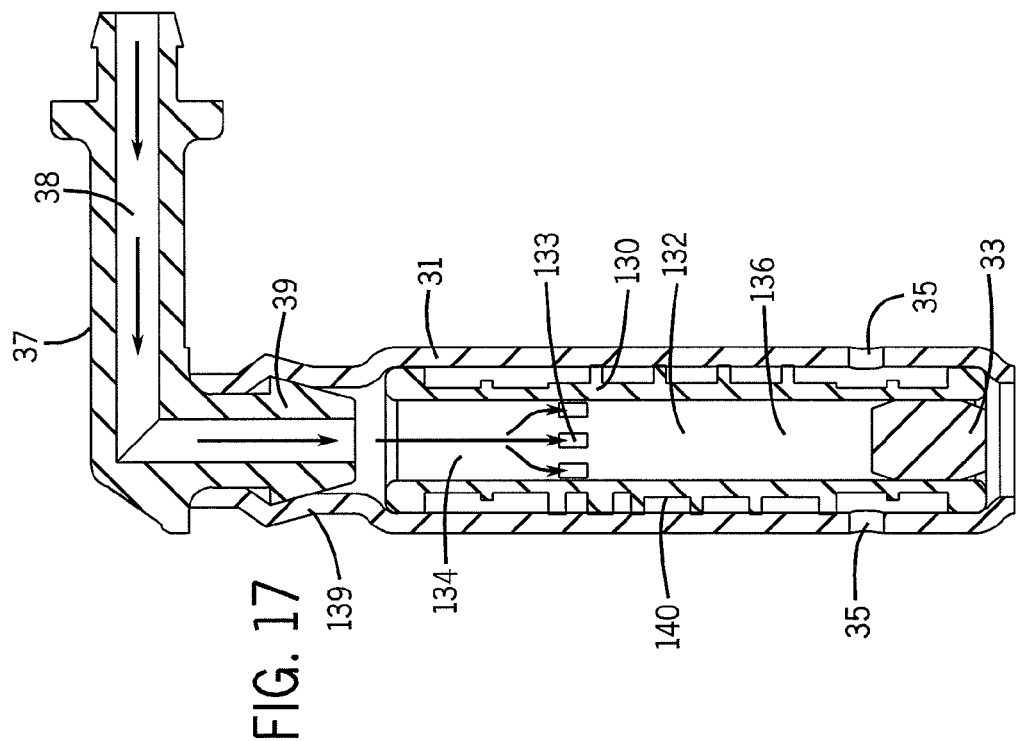
FIG. 18 is a view similar to FIG. 17 but is only partially cross-sectioned to illustrate a first portion of the outer surface of the labyrinth structure shown disposed at the right side of the drip emitter.
Figure 20:
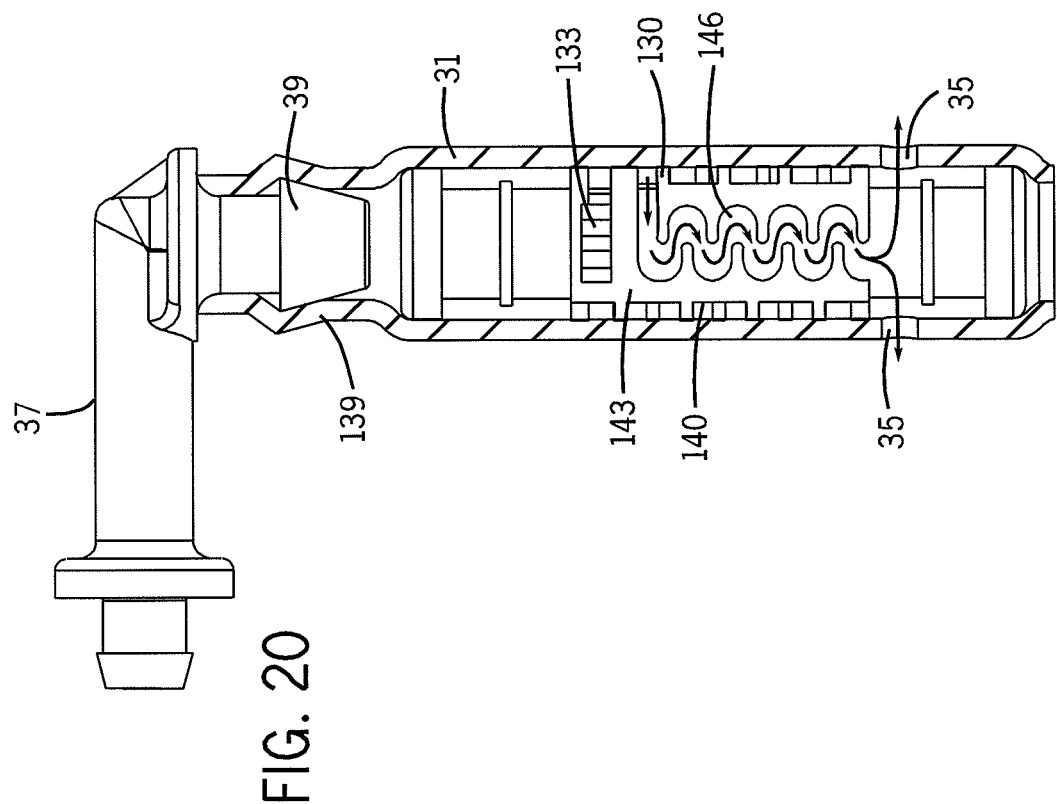
FIG. 20 is a left side and partially cross-sectioned view of the drip emitter showing a third portion of the outer surface of the labyrinth structure.
Figure 19:
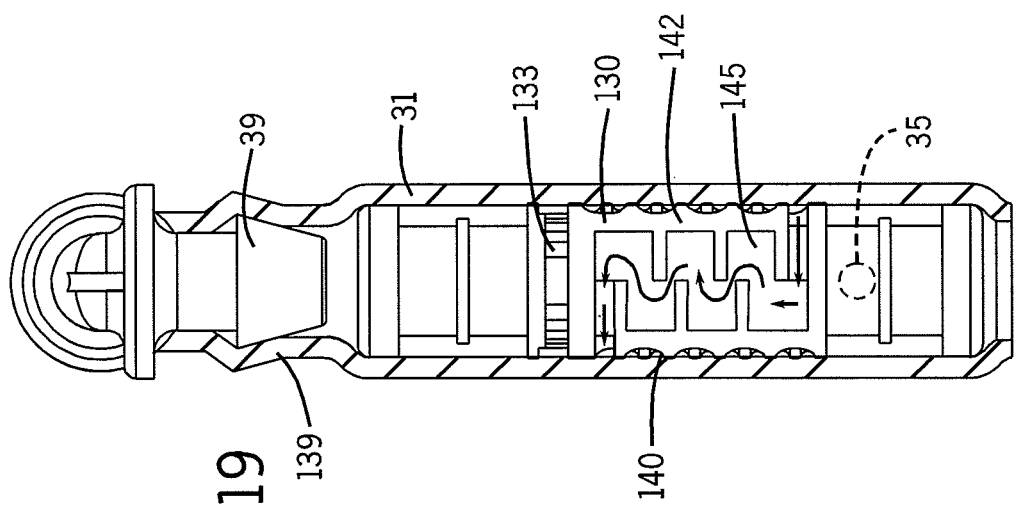
FIG. 19 is a front and partially cross-sectioned view of the drip emitter showing a second portion of the outer surface of the labyrinth structure.

Referring now to FIG. 16, it will be seen that a drip emitter 31 is attached to the main control valve assembly 30, 40 by means of an emitter attachment tube 37 that has an inner water passageway 38. The attachment tube 37 is an L-shaped structure having a downwardly-extending attachment end 39. The attachment end 39 is a barbed cylindrical structure. See FIGS. 17-20 which show the drip emitter 31 attached to the barbed end 39 of the attachment tube 37 via an uppermost tube portion 139. The drip emitter 31 is a tube-like structure that comprises an emitter chamber 32 having an upper chamber portion 34 and a lower chamber portion 36. Disposed within the lower chamber portion 36 of the emitter 31 is an emitter plug 33. In the preferred embodiment, the emitter 31 is a pressure compensating device that allows water to flow freely around and through a labyrinth structure 130 that is disposed inside the emitter chamber 32 of the emitter 31. In this configuration, any contaminant inside the emitter 31 is flushed through outlets 35. This makes the emitter 31 a self-flushing device, the flushing action occurring at the beginning and at the end of every flush cycle. The emitter plug 33 is disposed at the lower chamber portion 36 of the emitter 31. The significance of this structure will be further apparent later in this detailed description.

Figure 10:
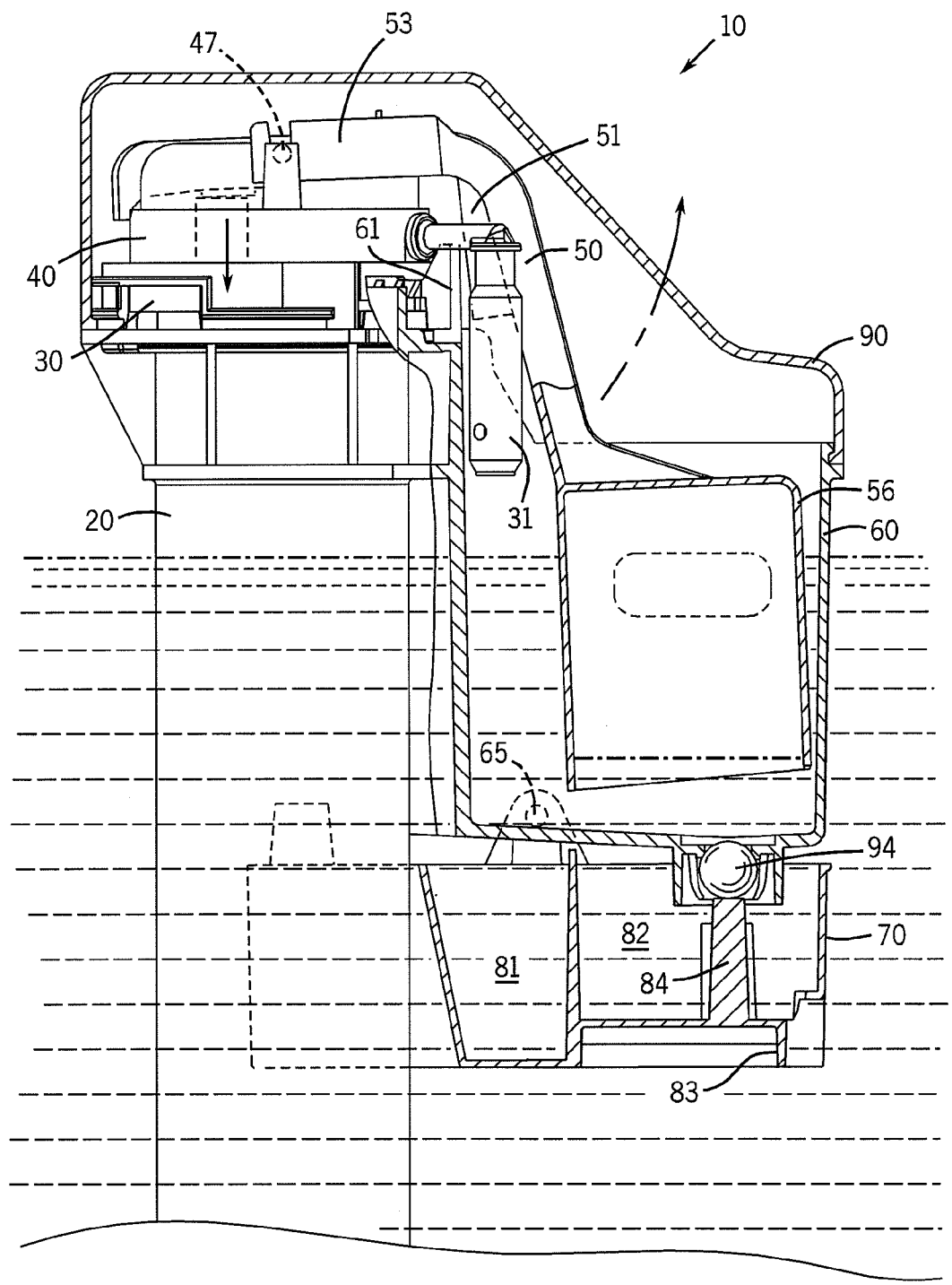
FIG. 10 is a partially sectioned left side elevational view of the assembly shown in FIGS. 1 and 2 and illustrating the pre-flush position of the assembly elements.
Figure 11:
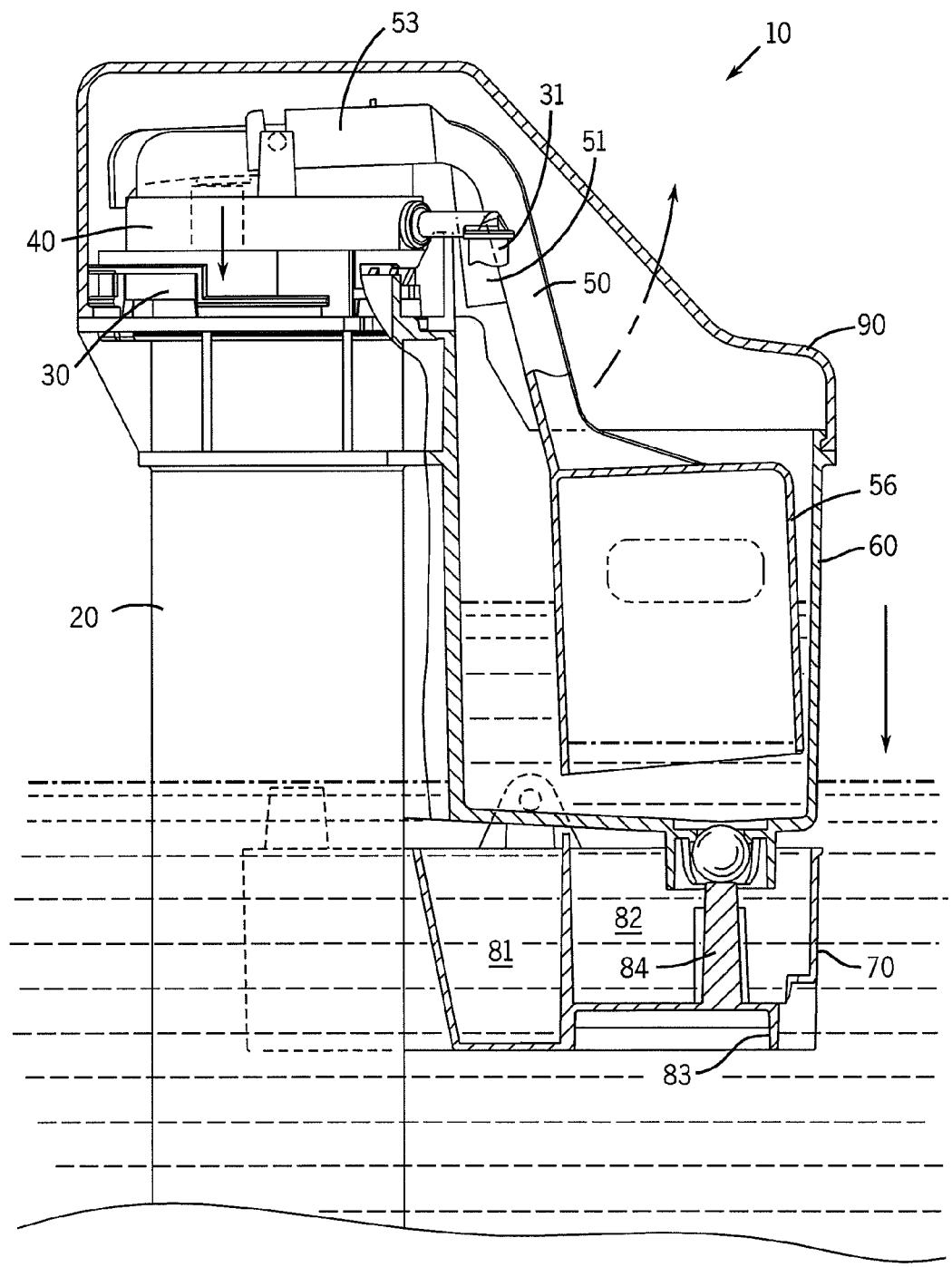
FIG. 11 is a view similar to FIG. 10, but illustrating the immediate post-flush position of the assembly elements.

Referring back to FIGS. 10 through 15, the typical duty cycle of the improved assembly 10 of the present invention is illustrated. FIG. 10 illustrates the "pre-flush" position of the various elements of the assembly 10. As shown, the float 56 is buoyed by air contained within it and the pilot orifice is closed. FIG. 11 illustrates the immediate "post-flush" position of the various elements of the assembly 10. As shown, the float 56 is still sufficiently buoyed and drainage of the water held within the float chamber 66 is prevented by virtue of the ball valve 92, the ball 94 thereof remaining sufficient buoyant due to the water level.

Figure 12:
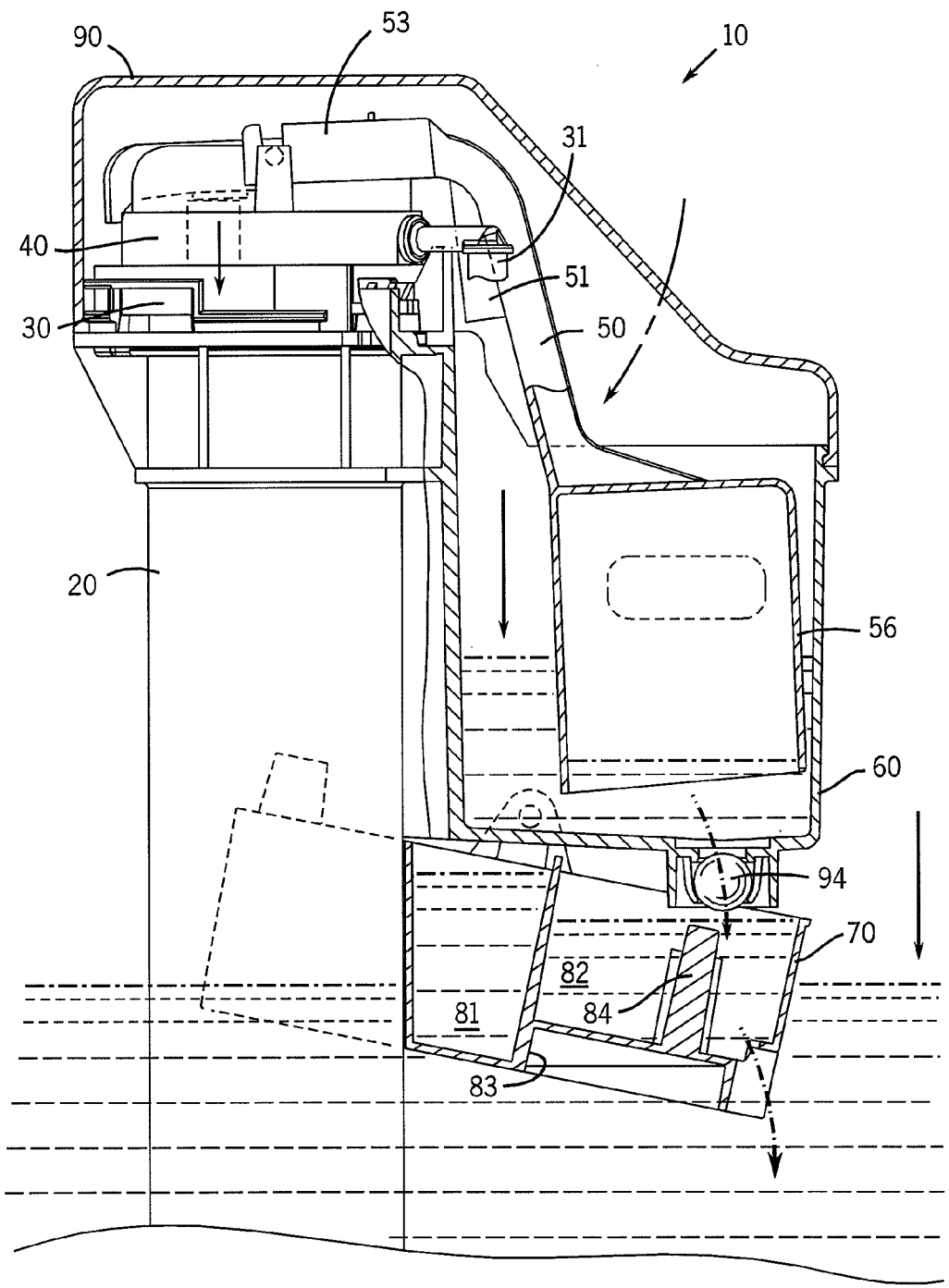
FIG. 12 is a view similar to FIG. 10, and illustrating the position of the assembly elements shortly after the immediate post-flush position in FIG. 11.

As the water level within the tank continues to drop to the point that the ball 94 of the ball valve 92 is unable to remain buoyant, as is shown in FIG. 12, water within the float chamber 66 begins to drain from the float housing 60 and into the pivot valve body 70. At this point, a small amount of water is also draining from the second compartment 82 of the pivot valve body 70. It is to be noted that the size of the drain hole 79 within the second compartment 82 is designed to maximize this performance in accordance with a timed scheme.

Figure 13:
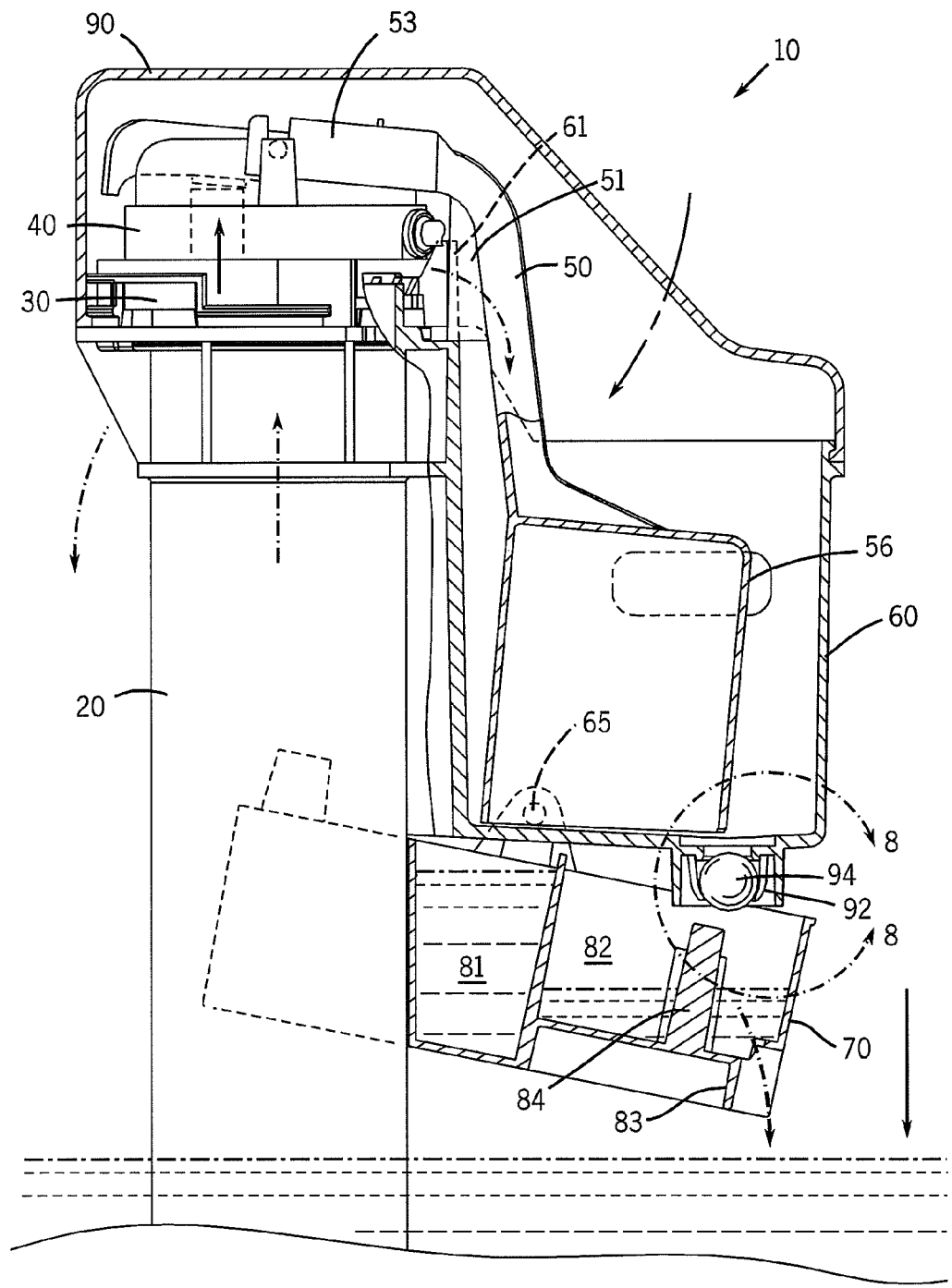
FIG. 13 is a view similar to FIG. 10, but illustrating the tank water level as being well below the level of the float housing and the pivot valve body, and showing the float housing and the pivot valve body emptying themselves of water.

Referring now to FIG. 13, it will be seen that the water level within the tank has now dropped to the point where water within the float chamber 66 is insufficient to keep the float 56 buoyant and it slowly drops downwardly towards the floor 68 of the float housing 60. At this point, a controlled flow of water from the second compartment 82 of the pivot valve body 70 keeps the second compartment 82 side of the pivot valve body 70 tipped downwardly at the front wall 78 of the pivot valve body 70. Recall at this point that the rear wall 74 of the pivot valve body 70 is angled. This angularity restricts the movement of the pivot valve body 70 relative to the filler tube 20. At this point, the float 56 is fully down within the float chamber 66 and the float arm float vein 51 is moved into the riverette opening 61 of the float housing rear wall 62.

Figure 14:
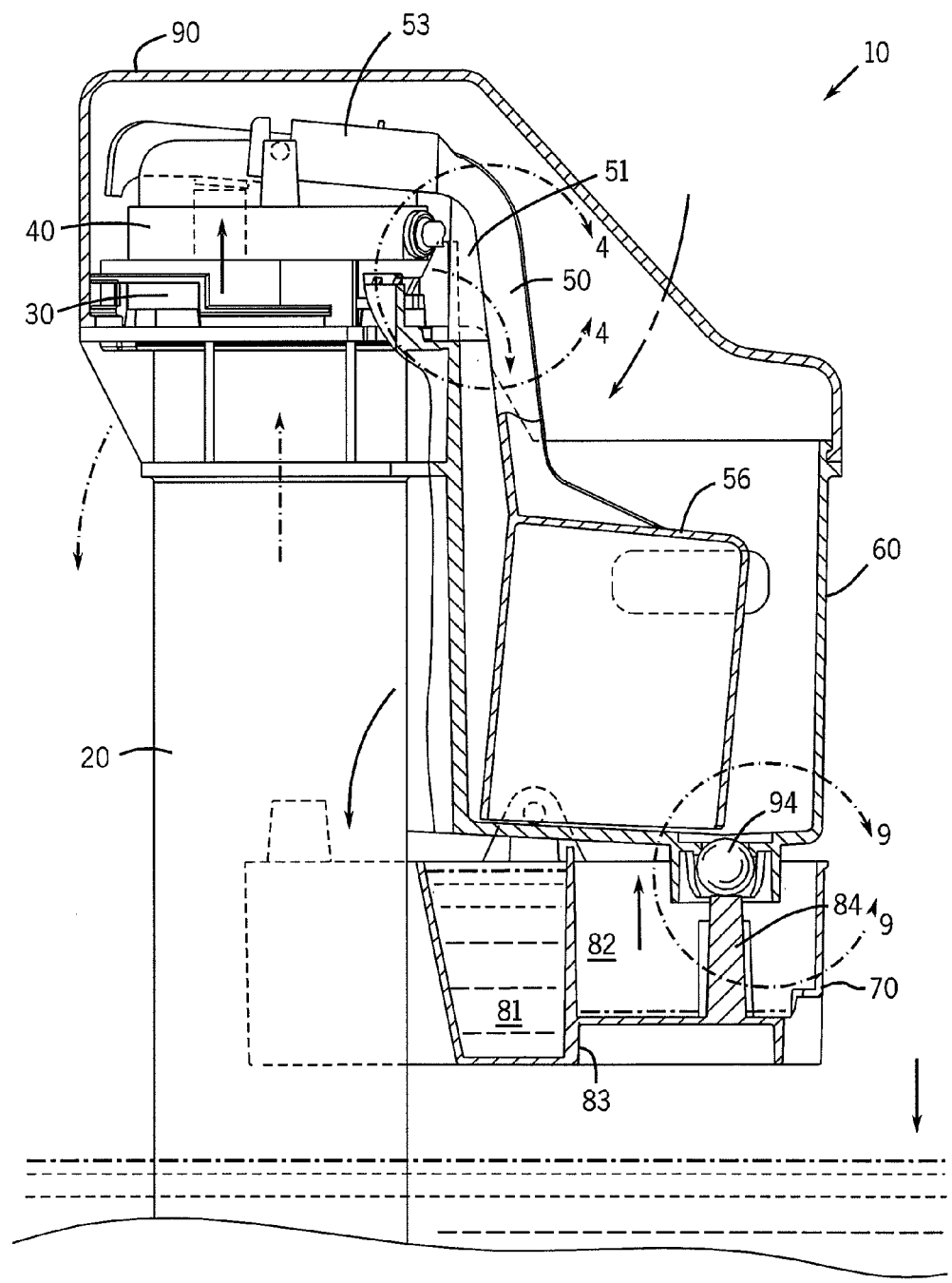
FIG. 14 is a view similar to FIG. 10, but illustrating how the pivot valve body rotates about its point of connection with the bottom of the float housing to close the check valve thus blocking water flow from the float housing into the pivot valve body.

With the water level in the tank almost fully depleted and the water contained within the second compartment 82 of the pivot valve body 70 being essentially depleted, the weight of the water that is contained in the first compartment 81 of the pivot valve body 70 now causes the pivot valve body 70 to pivot about the axis created by its pivot points 71 to the point shown in FIG. 14. At this position, the finger 84 disposed within the second compartment 82 of the pivot valve body 70 pushes the ball 94 of the ball valve 92 upwardly to close that valve 92, thus preventing the flow of water out of the float chamber 66.

Referring to FIGS. 17 through 20, they show the drip emitter labyrinth structure 130 disposed within the emitter chamber 32. The labyrinth structure 130 is a substantially cylindrical structure having an upper portion 134, a lower portion 136, and inner chamber 132 and an outer surface 140. As water flows through the attachment tube 37, it continues to flow into the inner chamber 132 of the labyrinth structure 130. As the water rises in the inner chamber 132, it eventually reaches the level of a plurality of water flow outlets 133 defined within the labyrinth structure 130. From the water flow outlets 133, water flows downwardly along a first side portion 141 of the outer surface 140 through a first generally serpentine pathway 144. See FIG. 18. Water then courses to a second side portion 142 of the outer surface 140 and flows upwardly through a second generally serpentine pathway 145. See FIG. 19. When the water reaches the top of the second side portion 142, it then flows downwardly again through a third generally serpentine pathway 146 that is defined within a third side portion 143 of the labyrinth structure 130. When the water reaches the bottom of the third side portion 143, it exits through the outlets 35 of the emitter 31. See FIG. 20. This water then slowly fills the float chamber 66 as will be discussed later in this detailed description.

Under conditions where the tank is properly emptying and filling, the water level will again rise to the point shown in FIG. 10, thus raising the float 56 and shutting off the main fill valve 50. At this point, it should be mentioned that the third compartment 83 of the pivot valve body 70 serves as a chamber that traps air within it and which tends to push the second compartment 82 end of the body 70 upwardly. This, in turn, closes the check valve 92 and allows the float chamber 66 to properly fill.

Figure 15:
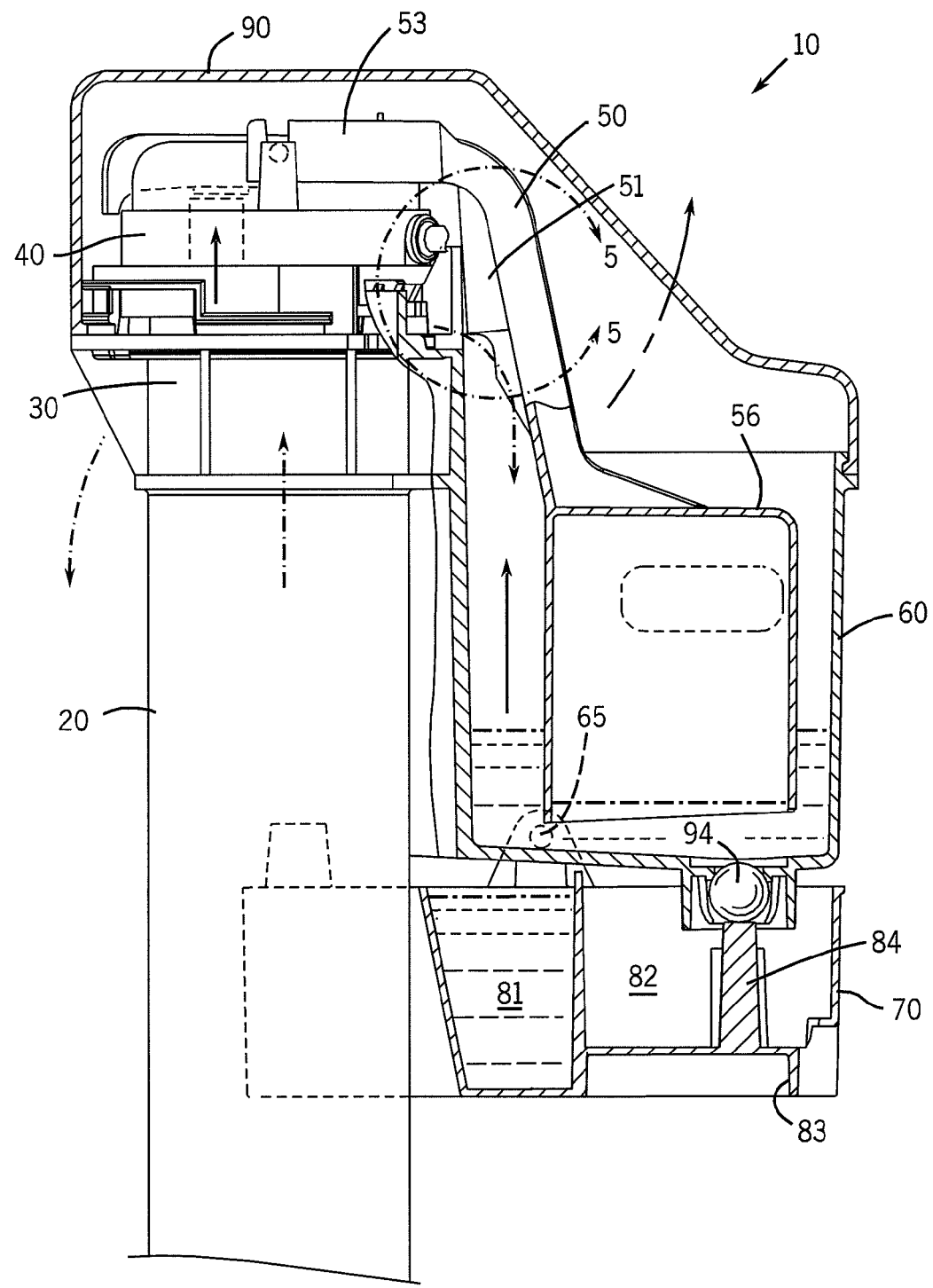
FIG. 15 is a view similar to FIG. 10, but illustrating how the float eventually rises within the float housing to turn off the primary fill valve when a no-fill condition within the tank exists, the tank being substantially void of water.

However, under conditions where an opening in the tank is not permitting the float housing 60 to fill with water sufficiently to raise the float 56, a small trickle of water that has been diverted from the pilot orifice structure is being introduced into the float chamber 66. This is accomplished by means of the pressure compensating drip emitter 31. In the preferred embodiment, the drip emitter 31 will drip 5 ml./min. of water into the float chamber 66. At the point that the float chamber 66 is filled to approximately 80% of its capacity, the float 56 will begin to move upwardly. At this "fill" point, the riverette opening 61 that is defined within the rear wall 62 of the float housing 60, which also forms a water flow continuum with the float chamber 66, will allow the remaining 20% of the float chamber 66 to fill, and it will fill more quickly. Under the same conditions, the first compartment 81 of the pivot valve body 70, which first compartment 81 contains an amount of water in it, causes the pivot valve body 70 to rotate to its position shown in FIG. 14 thereby blocking the flow of water from the float housing 60. In this fashion, a small amount of water will slowly accumulate within the float chamber 66 and eventually to the point that the float 56 is raised and the pilot orifice of the fill valve is shut off. This condition is illustrated in FIG. 15.

As previously discussed, the float valve 50 includes the structural elements that further allow the water to trickle into the float chamber 66 at a very slow rate. These structures are the emitter 31 and the float vein 51 on the float arm 52 which engages the riverette opening 61 within the rear wall 62 of the float housing 60. It is to be noted that, as the trickling water fills the float chamber 66 via the emitter 31 to a point that the float vein 51 begins to move out of the riverette opening 61, the water flow rate through the clearance 11 between the riverette opening 61 and the float vein 51 actually accelerates, thus closing the pilot orifice even more quickly under these conditions. Again, see FIGS. 4 and 5.

Finally, it should be noted that the apparatus and system 10 of the present invention can be re-set for normal toilet tank operation following the above-described sequence. This resetting may be accomplished by a number of methods. As shown in FIG. 7, and in phantom view in FIGS. 10 through 15, one sidewall 72 of the pivot valve body 70 includes a re-set arm 88 having a slotted aperture 89. In a first alternative embodiment, the re-set arm 88 may be manually actuated by the user simply reaching into the tank to tip the first compartment 81 side of the pivot valve body 70 upwardly to start the draining of the water from the float chamber 66, thus commencing normal sequencing of the flush cycle. In another alternative embodiment, a chain 87 (shown in phantom view in FIG. 7) of the type used to lift a flapper valve from the floor of a toilet tank may be secured at one end to the re-set arm 88, the arm 88 including the slotted aperture 89 which assists in attachment of that end of the chain 87 to the arm 88, and at the other end to the flush lever mechanism (also not shown). Holding down the flush lever mechanism for several seconds accomplishes the resetting of the tank system to normal function, assuming that the drainage problem has been corrected.

Although the foregoing has been described with a certain degree of particularity, it is to be understood that the present disclosure has been made by way of example only and that numerous changes in the construction and the arrangement of components, some of which have been alluded to, may be resorted to without departing from the spirit and scope of the invention as it is described.

The principles of this invention being described in accordance with the foregoing, I claim as our invention the following:

1. An improved fill valve for a water storage tank, said fill valve comprising a riser assembly, a valve housing mounted on an upper end of the riser assembly, a pilot valve mounted in the valve housing, a float housing connected to the valve housing and a combination float arm and float, the float arm being pivotally connected to the valve housing and having a first end for opening and closing a pilot orifice in the valve housing and a second end connected to the float, the float being located in the float housing, the float housing having an inlet opening for allowing water to spill into the float housing so that the float rises rapidly upwardly and the first end of the arm fully seals off the pilot orifice, an opening in a bottom wall of the float housing and a check valve mounted in the opening for permitting water to drain from the float housing only after a water level of a storage tank in which the fill valve is mounted is below a bottom of the float housing, the improvement comprising:
   a pivot valve body;
   means for pivoting the pivot valve body between a first position and a second position; and
   a pressure compensating drip emitter, the drip emitter comprising a tube-like structure that comprises a chamber having a lower chamber portion, an upper chamber portion and an emitter plug, the upper chamber portion housing a labyrinth structure with outlets, the labyrinth structure comprising a substantially cylindrical structure comprising an upper portion, a lower portion, an inner chamber and an outer surface;
   wherein the pivot valve body in the first position allows the check valve to be in an open position;
   wherein the pivot valve body in the second position allows the check valve to be in a closed position; and
   wherein the drip emitter trickles water into the float housing.

2. The improved fill valve of claim 1 wherein the outer surface of the labyrinth structure comprises:
   a first side portion comprising a first generally serpentine pathway;
   a second side portion comprising a second generally serpentine pathway; and
   a third side portion comprising a third generally serpentine pathway.

3. The improved fill valve of claim 2 wherein the labyrinth structure further comprises a water flow continuum formed by at least one water flow outlet from the inner chamber, the pathway of the first side portion, the pathway of the second side portion, the pathway of the third side portion and at least one emitter outlet.

4. The improved fill valve of claim 2 wherein the labyrinth structure further comprises:
   at least one water flow outlet to the inner chamber, the outlet disposed at the upper chamber portion; and
   at least one emitter outlet disposed at the lower chamber portion;
   wherein water flowing out of the at least one water flow outlet flows downwardly within the serpentine pathway of the first side portion, then upwardly within the serpentine pathway of the second side portion, then downwardly within the serpentine pathway of the third side portion and then outwardly from the at least one emitter outlet.

5. The improved fill valve of claim 1 wherein the drip emitter functionally cooperates with a rib and a rib-receiving aperture to allow water to fill the float housing.

6. The improved fill valve of claim 5 wherein the drip emitter is designed to fill the float housing to a fill point capacity prior to the rib and the rib-receiving aperture filling the float housing to full capacity.

7. The improved fill valve of claim 6 wherein the fill point capacity is approximately 80% of full capacity of the float housing.

* * * * *